United States Patent
Strasman et al.

(10) Patent No.: US 9,729,474 B2
(45) Date of Patent: Aug. 8, 2017

(54) PROXY SCHEMES FOR VOICE-OVER-LTE CALLS

(71) Applicant: VASONA NETWORKS INC., Santa Clara, CA (US)

(72) Inventors: Nery Strasman, Ramat Gan (IL); Ariel Peltz, Tel Aviv (IL); Ofer Weill, Modiin (IL)

(73) Assignee: VASONA NETWORKS INC., San Jose, CA (US)

(*) Notice: Subject to any disclaimer, the term of this patent is extended or adjusted under 35 U.S.C. 154(b) by 63 days.

(21) Appl. No.: 14/738,961

(22) Filed: Jun. 15, 2015

(65) Prior Publication Data

US 2015/0365374 A1 Dec. 17, 2015

Related U.S. Application Data

(60) Provisional application No. 62/012,999, filed on Jun. 17, 2014, provisional application No. 62/013,000, (Continued)

(51) Int. Cl.
*H04W 4/00* (2009.01)
*H04L 12/861* (2013.01)
(Continued)

(52) U.S. Cl.
CPC ...... *H04L 49/9005* (2013.01); *H04L 65/1069* (2013.01); *H04L 65/608* (2013.01);
(Continued)

(58) Field of Classification Search
None
See application file for complete search history.

(56) References Cited

U.S. PATENT DOCUMENTS

| 2012/0127975 A1 | 5/2012 | Yang et al. |
| 2013/0072167 A1* | 3/2013 | Aguirre ............... H04W 48/10 455/414.1 |

(Continued)

FOREIGN PATENT DOCUMENTS

WO 2012178117 A2 12/2012

OTHER PUBLICATIONS

International Application # PCT/US15/35723 Search Report dated Dec. 18, 2015.

(Continued)

*Primary Examiner* — Bob Phunkulh
(74) *Attorney, Agent, or Firm* — D. Kligler IP Services Ltd.

(57) ABSTRACT

A method includes, in a wireless data network, monitoring communication conditions at an intermediate location between a wireless communication terminal and a network element that provides voice-call services over the network to the wireless communication terminal. Upon detecting that the communication conditions are expected to cause the wireless communication terminal to send a notification to the network element, an early notification is sent to the network element on behalf of the terminal. Another method includes detecting a notification in which a terminal notifies a network element of degraded reception performance. A modification, which the network element is expected to perform in a transmission characteristic to the terminal in response to the notification, is predicted. In-flight communication traffic, which is en-route to the terminal and whose transmission characteristic is not yet modified in response to the notification, is intercepted. The predicted modification is applied to the in-flight communication traffic.

28 Claims, 2 Drawing Sheets

Related U.S. Application Data filed on Jun. 17, 2014, provisional application No. 62/013,002, filed on Jun. 17, 2014.

(51) Int. Cl.

| | | |
|---|---|---|
| *H04M 7/00* | (2006.01) | |
| *H04W 24/08* | (2009.01) | |
| *H04W 72/10* | (2009.01) | |
| *H04L 29/06* | (2006.01) | |
| *H04W 24/02* | (2009.01) | |
| *H04W 28/02* | (2009.01) | |
| *H04W 88/18* | (2009.01) | |

(52) U.S. Cl.
CPC ............ *H04L 65/80* (2013.01); *H04M 7/006* (2013.01); *H04W 24/02* (2013.01); *H04W 24/08* (2013.01); *H04W 72/10* (2013.01); *H04W 28/0273* (2013.01); *H04W 28/0284* (2013.01); *H04W 28/0289* (2013.01); *H04W 88/182* (2013.01)

(56) References Cited

U.S. PATENT DOCUMENTS

| | | | |
|---|---|---|---|
| 2013/0188484 A1* | 7/2013 | Aksu ................... | H04L 47/32 370/235 |
| 2013/0194937 A1* | 8/2013 | Sridhar ................ | H04L 47/24 370/252 |
| 2013/0272121 A1* | 10/2013 | Stanwood ........... | H04L 47/2475 370/230 |
| 2013/0286879 A1* | 10/2013 | ElArabawy ....... | H04N 21/26208 370/252 |
| 2013/0301610 A1 | 11/2013 | Ali et al. | |
| 2013/0343252 A1* | 12/2013 | Chakraborty ..... | H04W 52/0261 370/311 |
| 2014/0080503 A1 | 3/2014 | Issakov et al. | |
| 2014/0162661 A1* | 6/2014 | Shaw .................. | H04W 36/22 455/439 |
| 2014/0176660 A1* | 6/2014 | Khay-Ibbat ........ | H04W 36/30 348/14.02 |
| 2014/0233390 A1* | 8/2014 | Schmid ............... | H04L 47/125 370/236 |
| 2014/0269373 A1* | 9/2014 | Nimmala ............ | H04W 24/02 370/252 |
| 2014/0269624 A1* | 9/2014 | Khay-Ibbat ........ | H04W 36/30 370/332 |
| 2015/0009874 A1 | 1/2015 | Edara et al. | |
| 2015/0019746 A1* | 1/2015 | Shatzkamer ........ | H04L 65/1069 709/228 |
| 2015/0103755 A1* | 4/2015 | Cui .................... | H04W 48/20 370/329 |
| 2015/0117205 A1* | 4/2015 | Palyi ................... | H04L 47/24 370/235 |
| 2015/0156666 A1* | 6/2015 | Won ................... | H04W 28/0231 370/229 |
| 2015/0230199 A1* | 8/2015 | Jeong ................. | H04W 28/0268 455/458 |
| 2015/0358483 A1* | 12/2015 | Jeong ................. | H04W 28/0289 370/328 |
| 2016/0050653 A1* | 2/2016 | Rastogi .............. | H04W 72/0406 455/453 |
| 2016/0157114 A1* | 6/2016 | Kalderen ............ | H04W 24/08 370/252 |
| 2016/0249248 A1* | 8/2016 | Ronneke ............ | H04W 28/0284 |

OTHER PUBLICATIONS

TS 23.401., "Technical Specification Group Services and System Aspects; General Packet Radio Service (GPRS) enhancements for Evolved Universal Terrestrial Radio Access Network (E-UTRAN) access", Release 13, version 13.2.0, 313 pages, Mar. 2015.

ETSI TS 136 300., LTE; Evolved Universal Terrestrial Radio Access (E-UTRA) and Evolved Universal Terrestrial Radio Access Network (E-UTRAN); Overall description; Stage 2 (3GPP TS 36.300 version 8.9.0, Release 8),163 pages, Jul. 2009.

Schulzrinne et al., "RIP: A Transport Protocol for Real-Time Applications", Network Working Group, RFC 3550, 89 pages, Jul. 2003.

GSM Association, "Official Document IR.92—IMS Profile for Voice and SMS", Version 7.0, 32 pages, Mar. 3, 2013.

Strasman et al., U.S. Appl. No. 14/738,957, filed Jun. 16, 2015.

U.S. Appl. No. 14/738,957 Office Action dated Oct. 6, 2016.

U.S. Appl. No. 14/738,957 Office Action dated Mar. 31, 2017.

\* cited by examiner

PROXY SCHEMES FOR VOICE-OVER-LTE CALLS

CROSS-REFERENCE TO RELATED APPLICATIONS

This application claims the benefit of U.S. Provisional Patent Application 62/012,999, U.S. Provisional Patent Application 62/013,000 and U.S. Provisional Patent Application 62/013,002, all filed Jun. 17, 2014, whose disclosures are incorporated herein by reference. This application is related to a U.S. patent application Ser. No. 14/738,957 entitled "Efficient processing of Voice-over-LTE call setup," filed on even date, whose disclosure is incorporated herein by reference.

FIELD OF THE INVENTION

The present invention relates generally to wireless communication, and particularly to methods and systems for enhancing performance of voice calls exchanged over data networks.

BACKGROUND OF THE INVENTION

Evolved UMTS Terrestrial Radio Access (E-UTRA) protocol, also referred to as Long-Term Evolution (LTE), is a wireless communication protocol specified by the Third Generation Partnership Project (3GPP). Advanced versions of the LTE are referred to as LTE-Advanced (LTE-A). As part of the IP Multimedia Subsystem (IMS) architecture used in LTE and LTE-A, several protocols have been developed for transferring voice calls over LTE networks. These protocols are referred to as Voice over LTE (VoLTE). VoLTE is specified, for example, in Permanent Reference Document (PRD) IR.92 of the GSM Association (GSMA), entitled "IMS Profile for Voice and SMS," version 7.0, Mar. 3, 2013, which is incorporated herein by reference.

SUMMARY OF THE INVENTION

An embodiment of the present invention that is described herein provides a method for communication, including monitoring communication traffic in a wireless data network that serves wireless communication terminals. Control messages, relating to setting-up of voice calls over the wireless data network for the wireless communication terminals, are identified in the communication traffic. Precedence is given to the identified control messages, relative to other communication traffic that is not related to setting-up of voice calls. The communication traffic is controlled selectively in accordance with the precedence.

In some embodiments, the wireless data network includes a Long-Term Evolution (LTE) or LTE-Advanced (LTE-A) network, and the voice calls include Voice-over-LTE (VoLTE) calls. In some embodiments, monitoring the communication traffic is performed on a backhaul interface between base stations and network elements of the wireless data network. In an embodiment, the wireless data network includes a Long-Term Evolution (LTE) or LTE-Advanced (LTE-A) network, and the backhaul interface includes an S1 interface.

In another embodiment, monitoring the communication traffic includes buffering the communication traffic in one or more queues, and selectively controlling the communication traffic includes delaying the buffered traffic that is not related to setting-up of voice calls.

In yet another embodiment, identifying the control messages includes intercepting a message that is sent from a wireless communication terminal to a network element of the wireless data network and relates to setting up a voice call for the wireless communication terminal, and the method includes sending to the wireless communication terminal a response to the message, before the network element responds to the message.

In still another embodiment, identifying the control messages includes intercepting a message that is sent from a network element of the wireless data network to a wireless communication terminal and relates to setting up a voice call for the wireless communication terminal, and the method includes sending to the network element a response to the message, before the wireless communication terminal responds to the message.

There is additionally provided, in accordance with an embodiment of the present invention, a communication apparatus including an interface and processing circuitry. The interface is configured for connecting to a wireless data network that serves wireless communication terminals. The processing circuitry is configured to monitor communication traffic in the wireless data network, to identify in the communication traffic control messages relating to setting-up of voice calls over the wireless data network for the wireless communication terminals, to give precedence to the identified control messages relative to other communication traffic that is not related to setting-up of voice calls, and to selectively control the communication traffic in accordance with the precedence.

There is further provided, in accordance with an embodiment of the present invention, a method for communication including, in a wireless data network, monitoring communication conditions at an intermediate location between a wireless communication terminal and a network element that provides voice-call services over the wireless data network to the wireless communication terminal. Upon detecting that the communication conditions are expected to cause the wireless communication terminal to send a notification to the network element, an early notification is sent to the network element on behalf of the wireless communication terminal.

In some embodiments, detecting the communication conditions and sending the early notification are performed during a voice call conducted by the wireless communication terminal. In an embodiment, sending the early notification is performed independently of and transparently to the wireless communication terminal.

In a disclosed embodiment, detecting the communication conditions is performed at a point in time at which the wireless communication terminal is unaware that the communication conditions warrant sending the notification. In an embodiment, the wireless data network includes a Long-Term Evolution (LTE) or LTE-Advanced (LTE-A) network, and the voice-call services include Voice-over-LTE (VoLTE) services. In an example embodiment, the intermediate location includes a backhaul interface of the wireless data network.

There is also provided, in accordance with an embodiment of the present invention, a communication apparatus including an interface and processing circuitry. The interface is configured for connecting to a wireless data network that serves wireless communication terminals The processing circuitry is configured to monitor communication conditions at an intermediate location between a wireless communication terminal and a network element that provides voice-call services over the wireless data network to the wireless communication terminal, and, upon detecting that the communication conditions are expected to cause the wireless communication terminal to send a notification to the network element, to send an early notification to the network element on behalf of the wireless communication terminal.

There is additionally provided, in accordance with an embodiment of the present invention, a method for communication including, in a wireless data network in which a network element provides voice-call services to wireless communication terminals, detecting a notification in which a wireless communication terminal notifies the network element of degraded reception performance. A modification, which the network element is expected to perform in a transmission characteristic to the wireless communication terminal in response to the notification, is predicted. In-flight communication traffic, which is en-route to the wireless communication terminal and whose transmission characteristic is not yet modified in response to the notification, is intercepted. The predicted modification is applied to the in-flight communication traffic.

In some embodiments, predicting and applying the modification are performed during a voice call conducted by the wireless communication terminal. In an embodiment, predicting and applying the modification are performed independently of and transparently to the network element.

In a disclosed embodiment, applying the modification includes modifying a speech coding scheme used in a voice call conducted by the wireless communication terminal. Additionally or alternatively, applying the modification includes modifying an error correction coding scheme used in a voice call conducted by the wireless communication terminal.

In some embodiments, the wireless data network includes a Long-Term Evolution (LTE) or LTE-Advanced (LTE-A) network, and the voice-call services include Voice-over-LTE (VoLTE) services. In an embodiment, detecting the notification and applying the modification are performed on a backhaul interface of the wireless data network.

There is further provided, in accordance with an embodiment of the present invention, a communication apparatus including an interface and processing circuitry. The interface is configured for connecting to a wireless data network in which a network element provides voice-call services to wireless communication terminals. The processing circuitry is configured to detect a notification in which a wireless communication terminal notifies the network element of degraded reception performance, to predict a modification that the network element is expected to perform in a transmission characteristic to the wireless communication terminal in response to the notification, to intercept in-flight communication traffic that is en-route to the wireless communication terminal and whose transmission characteristic is not yet modified in response to the notification, and to apply the predicted modification to the in-flight communication traffic.

The present invention will be more fully understood from the following detailed description of the embodiments thereof, taken together with the drawings in which:

DETAILED DESCRIPTION OF EMBODIMENTS

Overview

Embodiments of the present invention that are described herein provide methods and systems for improving the performance of setting-up and conducting voice calls over wireless data networks. The embodiments described herein refer mainly to VoLTE calls conducted over LTE and LTE-A networks, but the disclosed techniques can be used with other suitable types of voice calls and data networks.

In some embodiments, a VoLTE enhancement system is deployed at a suitable intermediate location in an LTE or LTE-A network, between the wireless communication terminals and the IP Multimedia Subsystem (IMS) that provides the VoLTE service. In the embodiments described herein, the system is coupled to the S1 backhaul interface of the network. This intermediate location enables the system to enhance VoLTE performance in various ways, e.g., to buffer and forward VoLTE traffic selectively, to predict detrimental communication conditions and react to them quickly, and/or to act as a proxy for the wireless terminals and/or the IMS.

In some embodiments, the system buffers the communication traffic on the S1 interface, identifies traffic related to setting-up of VoLTE calls, and gives this traffic precedence over other traffic. This scheme reduces the setup time of VoLTE calls, especially when call setup traffic contends for resources with other traffic.

In other embodiments, the system intercepts notifications in which wireless communication terminals inform the IMS of reception problems. Upon detecting such a notification, the system modifies the VoLTE call data in-flight between the IMS and the terminal, before the IMS reacts to the notification. For example, the system may modify the speech coding scheme or error correction coding scheme before the IMS performs this change. This proxy operation shortens the reaction time to changes in communication conditions.

In yet other embodiments, the system monitors the communication conditions at its intermediate location in the network. By virtue of its location, the system is able to detect detrimental communication conditions long before the wireless communication terminals are able to do so. Upon detecting that the communication conditions are expected to cause a wireless communication terminal to send a notification to the IMS, the system sends the IMS an early notification on behalf of the terminal. As with the previous technique, this proxy operation speeds-up the response to changes in communication conditions.

The methods and systems described herein overcome two of the major challenges of VoLTE-Long call setup times and long response time to changes in communication conditions.

As such, the disclosed techniques improve VoLTE performance and quality, and enhance VoLTE user experience.

System Description

Figure 1:
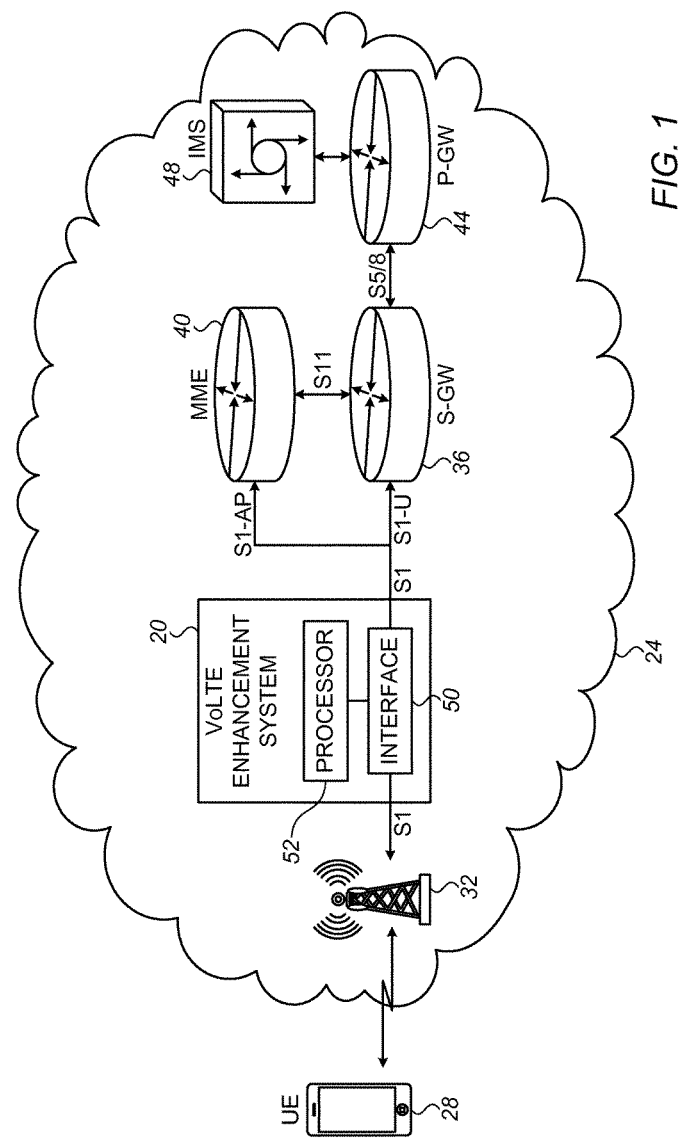
FIG. 1 is a block diagram that schematically illustrates a LTE communication network employing VoLTE enhancement, in accordance with an embodiment of the present invention.

FIG. 1 is a block diagram that schematically illustrates a VoLTE enhancement system 20 deployed in an LTE or LTE-A communication network 24, in accordance with an embodiment of the present invention. System 20 is used for improving the performance of setting up and conducting VoLTE voice calls, using methods that are described herein.

FIG. 1 shows a simplified view of an LTE or LTE-A network, focusing on the major network elements and interfaces that are of relevance to the disclosed techniques. In this example, wireless terminals referred to as User Equipment (UE) 28, communicate over wireless channels with base stations referred to as eNodeB 32. The figure shows a single UE 28 and a single eNodeB 32 for the sake of clarity, but real-life networks typically comprise multiple UE and multiple eNodeBs.

The network-side of network 24 comprises one or more Serving Gateways (S-GW) 36, a Mobility Management Entity (MME) 40, one or more Packet data network Gateways (P-GW) 44, and an IP Multimedia Subsystem (IMS) 48. The interface that connects eNodeBs 32 with S-GW 36 and MME is denoted S1, and comprises an S1-U interface (between the eNodeBs and the S-GW) and an S1-AP interface (between the eNodeBs and the MME). The S1 interface (including both S1-U and S1-AP is sometimes referred to as backhaul). The interface between the MME and S-GW is denoted S11, and the interface between the S-GW and P-GW is denoted S5/8.

The network elements and interfaces depicted in FIG. 1 are specified, for example, in a 3GPP specification entitled "Technical Specification Group Services and System Aspects; General Packet Radio Service (GPRS) enhancements for Evolved Universal Terrestrial Radio Access Network (E-UTRAN) access (Release 13)," TS 23.401, version 13.2.0, March, 2015; and in an ETSI specification entitled "LTE; Evolved Universal Terrestrial Radio Access (E-UTRA) and Evolved Universal Terrestrial Radio Access Network (E-UTRAN); Overall description; Stage 2," (3GPP TS 36.300, version 8.9.0 Release 8), July, 2007, which are incorporated herein by reference.

In order to set up VoLTE calls over network 24, UE should communicate with IMS 48, which provides the VoLTE service. The UE is assumed to be in a connected state, i.e., the network is aware of the UE existence and allows it to transact. Typically, UE 28 and MME 40 create a logical connection (referred to as a "bearer") between UE 28 and IMS 48, by exchanging control messages on the S1 interface.

The bearer connecting UE 28 and IMS 48 is an end-to-end connection, via eNodeB 32, S-GW 36 and P-GW 44. The bearer thus spans both the S1 and s5/8 interfaces. The exchange of messages that sets up the bearer also involves some communication between MME 40 and S-GW 36 on the S11 interface, and between MME 40 and P-GW 44 on the S11 and S5/8 interfaces. Once set up, a Session Initiation Protocol (SIP) connection is carried over this bearer. The SIP connection allows the UE and IMS to interact and take various actions, e.g., creating a voice session. The first bearer is thus also referred to herein as a "SIP bearer."

Creating a voice session or setting up a VoLTE phone call typically involves setting up a second bearer between UE 28 and IMS 48. The second bearer is created for carrying the call content itself (as opposed to the first bearer that is used for signaling and control). To set up the second bearer, control messages are again exchanged between UE 28, MME 40, S-GW 36 and P-GW 44. Once the second bearer is set up, the call may be conducted.

A VoLTE call is typically carried over Real-Time Transport Protocol (RTP). In parallel, RTP Control Protocol (RTCP) is typically used to monitor transmission statistics and Quality-of-Service (QoS) of the call. RTP and RTCP are specified, for example, in Request For Comments (RFC) 3350 of the Internet Engineering Task Force (IETF), entitled "RTP: A Transport Protocol for Real-Time Applications," July, 2003, which is incorporated herein by reference. Both RTP and RTCP messages are carried over the second bearer that carries the call. The second bearer is thus also referred herein to as a "RTP bearer."

As can be appreciated from the description above, setting up and conducting VoLTE calls involves complex and signaling-intensive processes. In practice, these processes are often long and slow to react to changes in network conditions, and may therefore cause poor quality and user experience.

Thus, in some embodiments, network 24 deploys a VoLTE enhancement system 20 that enhances the quality and performance of VoLTE calls. Several enhancement schemes are described in details below. In the present example, system 20 is located on the S1 interface, and comprises an interface 50 for connecting to the S1 interface, and a processor 52 that is configured to carry out the methods described herein. System 20 may be positioned at any suitable position on the S1 interface, e.g., adjacent to eNodeB 32 or adjacent to MME 40 or S-GW 36. Generally, however, system 20 should have access to both the S1-U and S1-AP interfaces.

The configurations of system 20 and network 24 in FIG. 1 are example configurations, which is chosen purely for the sake of conceptual clarity. In alternative embodiments, any other suitable configurations can be used. For example, in the embodiments described herein system 20 is coupled to the S1 interface. In alternative embodiments, however, system 20 may be deployed at other suitable intermediate locations in network 24, between IMS 48 and UEs 28. As another example, although the embodiments described herein refer mainly to LTE/LTE-A networks and to VoLTE voice calls, the disclosed techniques can be used for enhancing the performance of other suitable types of voice calls over other suitable wireless data networks.

The different elements of system 20 may be implemented using any suitable hardware, such as in an Application-Specific Integrated Circuit (ASIC) or Field-Programmable Gate Array (FPGA). In some embodiments, some elements of system 20 can be implemented using software, or using a combination of hardware and software elements. Generally, the functions of processor 52 described herein can be carried out using any suitable processing circuitry, in hardware and/or software.

In some embodiments, processor 52 comprises a general-purpose processor, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Reducing the Latency of Voice-Over-LTE Call Setup

One major drawback of the VoLTE call setup process described above is the long call setup time it may incur. The call setup time may be particularly long if the SIP connection and the SIP bearer carrying it do not exist and need to be set up. This scenario occurs, for example, when the UE was not engaged in a VoLTE call for a long time. In such a case, the SIP bearer would typically be released in order to free UE and network resources. In such a scenario, both the SIP bearer and the RTP bearer have to be set up before the call can start. The resulting call setup time, as experienced by the used, may be on the order of tens to hundreds of milliseconds typically, and in extreme cases up to several seconds.

In some embodiments, VoLTE enhancement system 20 reduces the setup time of VoLTE calls by giving precedence to traffic relating to VoLTE call setup over other traffic. This prioritization mechanism reduces delays that are caused by resource contention on the S1 interface, and possibly by resource contention in the eNodeB or UE.

As noted above, system 20 may be positioned at any suitable position on the S1 interface, e.g., adjacent to eNodeB 32 or adjacent to MME 40 or S-GW 36, as long as the system has access to both the S1-U and S1-AP interfaces. In some embodiments, processor 52 of system 20 can estimate the traffic volume (e.g., number of packets) that is queued in eNodeB 32, and/or at other points along the S1 interface. This information can be used, for example, to recognize that congestion is building up.

Figure 2:
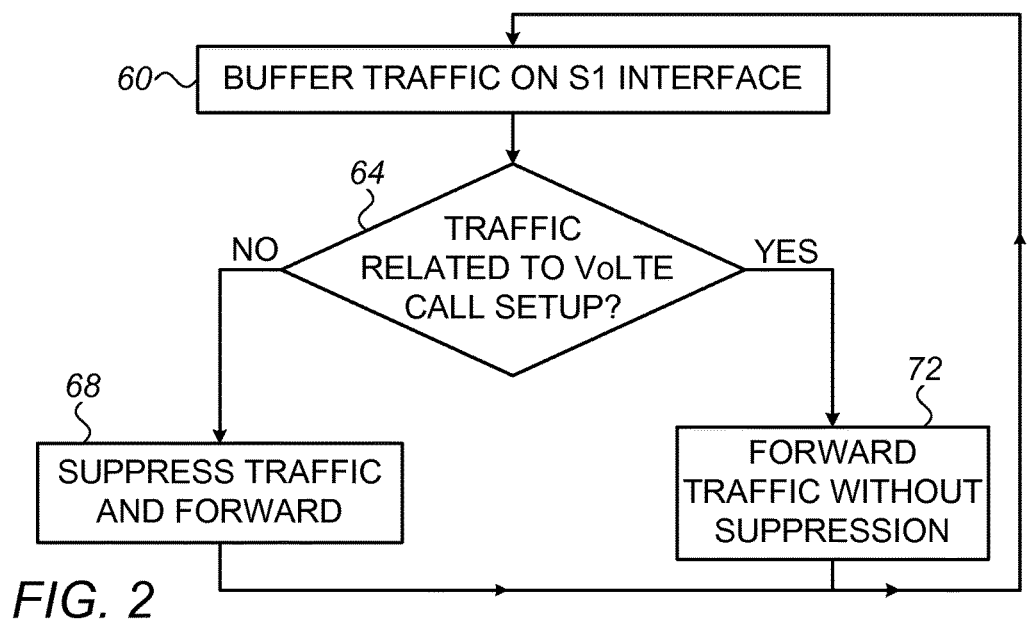
FIG. 2 is a flow chart that schematically illustrates a method for reducing the latency of VoLTE call setup, in accordance with an embodiment of the present invention.

FIG. 2 is a flow chart that schematically illustrates a method for reducing the latency of VoLTE call setup, in accordance with an embodiment of the present invention. The method begins with processor 52 of system 20 buffering the communication traffic that traverses the S1 interface, at a buffering step 60. Processor 52 typically buffers all S1 traffic, including both inbound and outbound traffic, and including the traffic on the S1-U interface and the traffic on the S1-AP interface. Buffering may be carried out using any suitable memory configuration, e.g., in one or more queues.

At a traffic classification step 64, processor 52 checks which of the buffered traffic is related to setup of VoLTE calls. In various embodiments, processor 52 may check, for example, for messages that relate to setting up of the SIP bearer and RTP bearer described above.

For a given portion of the traffic, e.g., packet, flow or transaction, if the traffic is found to be unrelated to VoLTE call setup, processor 52 suppresses (i.e., throttles-down) the traffic before forwarding it onwards, at a suppressed forwarding step 68. If, on the other hand, the traffic is found to be related to VoLTE call setup, processor 52 forwards the traffic onwards without suppression, at a direct forwarding step 72.

Processor 52 may suppress the traffic unrelated to VoLTE call setup in various ways. In one example embodiment, processor 52 delays this traffic, i.e., holds it in the queues for a longer period of time, relative to the traffic related to VoLTE call setup. In another embodiment, processor 52 buffers the traffic related to VoLTE call setup and the traffic unrelated to VoLTE call setup in different queues, forwards traffic from the former queue with high priority, and forwards traffic from the latter queue only when the former queue is empty. In a typical embodiment, processor 52 suppresses the traffic unrelated to VoLTE call setup only if and when necessary, not necessarily always. When conditions permit, suppression is not performed.

The examples above are depicted purely for the sake of conceptual clarity. In alternative embodiments, processor 52 may use any other suitable scheme of buffering and selectively forwarding traffic, in order to give precedence to VoLTE call setup traffic over other traffic.

In some embodiments, processor 52 may shorten the VoLTE call setup time by functioning as a proxy for UE 28 and/or for IMS 48. For example, processor 52 may intercept a message that is sent from UE 28 to IMS 48 and relates to setting up a VoLTE call for the UE. Such a message may relate, for example, to setting up of the SIP or RTP bearer for the call. When identifying such a message, processor 52 may send an early acknowledgement or other suitable response to the UE, before the IMS responds. Processor 52 may intercept and discard the genuine response arriving from the IMS, in order to avoid duplicate responses.

A similar process may be carried out in the opposite direction: Processor 52 may intercept a message that is sent from IMS 48 to UE 28 and relates to setting up a VoLTE call for the UE. Such a message may relate, for example, to setting up of the SIP or RTP bearer for the call. When identifying such a message, processor 52 may send an early acknowledgement or other suitable response to the IMS, before the UE responds. Processor 52 may intercept and discard the genuine response arriving from the UE, in order to avoid duplicate responses.

Enhancing Voice-Over-LTE Calls Using RTCP Proxy Operation

Another drawback of the long latencies encountered in VoLTE communication is the long reaction time to changes in communication conditions or other events. Consider, for example, a scenario in which UE 28 identifies a degradation in reception quality during a VoLTE call. The UE typically notifies IMS 48 of the problem using RTCP signaling over the RTP bearer described above. The notification traverses the network and reaches the IMS. The IMS may react to the notification by adapting one or more transmission characteristics, e.g., switching to a more robust speech coding scheme (codec) or Error Correction Coding (ECC) scheme.

In order for the reception problem to be resolved, a full round-trip feedback loop has to be completed. The UE has to detect the problem and notify the IMS; The IMS needs to react; the data after reaction has to reach the UE; the UE has to signal to the IMS that the problem has been resolved, and finally the IMS has to terminate the adaptation process. During this entire process, which may well take an order of a second to complete, the quality of the VoLTE call may suffer severe degradation.

In some embodiments, VoLTE enhancement system 20 reduces the reaction time illustrated above, by sending early notifications to IMS 48 on behalf of UE 28. As a result, the duration of degraded reception experienced by the UE is shortened significantly. In some embodiments, processor 52 of system 20 anticipates scenarios in which UE 28 is likely to send an RTCP notification that notifies IMS 48 of a reception problem. Because of its intermediate location in network 24 processor 52 is often able to predict such scenarios long before the UE senses any reception degradation. As noted above, the entire round-trip time for conventionally detecting and resolving the problem is long.

Processor 52 may perform this prediction, for example, by sensing that resources in eNodeB 32 or otherwise on the backhaul interface are heavily loaded or overloaded. Such a condition is often a good predictor that packets will soon be dropped. Processor 52 may detect such conditions, for example, by monitoring control traffic or user data over the S1 interface, information relating to handovers, or any other suitable information. Generally, processor 52 may detect any suitable communication conditions for this purpose.

Upon detecting network conditions that are expected to cause UE 28 to send an RTCP notification to IMS 48, processor 52 generates and sends an early notification on the UE's behalf. The UE is typically unaware of the existence of the early notification. The early notification typically has the same format as the genuine notification that the UE is expected to send.

The IMS is typically unaware that the early notification did not originate from the UE but from an intermediate party. The IMS thus responds to the early notification in the same manner it would have responded to the genuine notification from the UE. For example, the IMS may switch to a more robust speech coding scheme (codec) or Error Correction Coding (ECC) scheme for subsequent communication with this UE.

Since the IMS responds to the early notification (sent from system 20) and not to the genuine notification (sent from UE 28), the overall response time is shortened considerably. In an embodiment, processor 52 may intercept and discard the genuine notification arriving from the UE, in order to avoid duplicate notifications. In some cases processor 52 may modify the genuine notification arriving from the UE, such as re-stamping message sequence numbers if needed.

Figure 3:
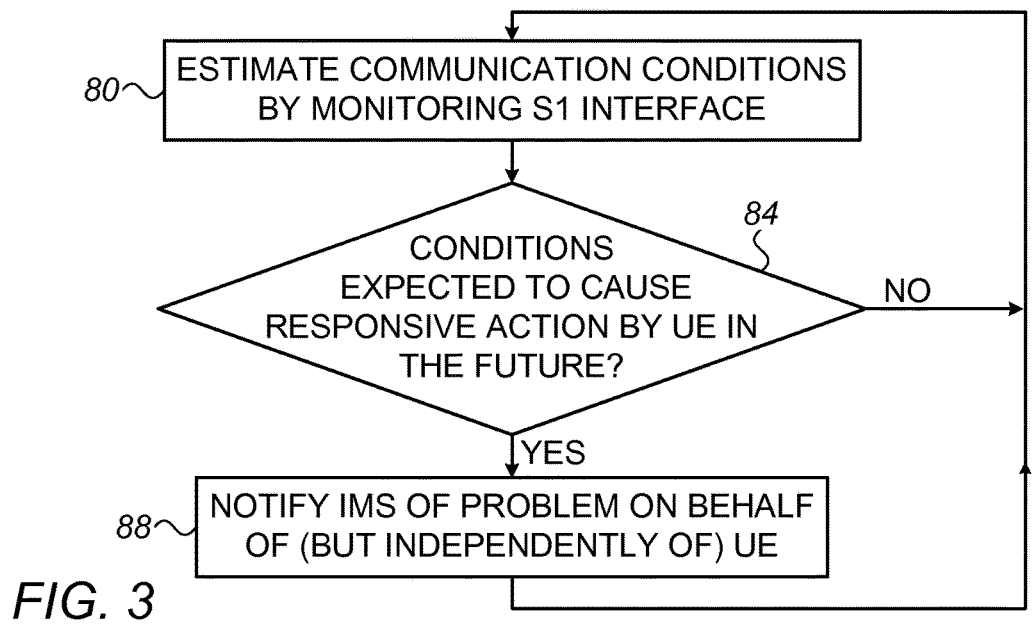
FIG. 3 is a flow chart that schematically illustrates a method for enhancing VoLTE calls using RTCP proxy operations, in accordance with an embodiment of the present invention.

FIG. 3 is a flow chart that schematically illustrates a method for enhancing VoLTE calls using RTCP proxy operations, in accordance with an embodiment of the present invention. The method begins with processor 52 of system 20 estimating the communication conditions, at a condition assessment step 80. Processor 52 checks whether the estimated communication conditions are expected to cause UE 28 to send an RTCP notification to IMS 48, at a condition checking step 84. If so, processor 52 sends IMS 48 an early RTCP notification on behalf of (but independently of) UE 28, at an early notification step 88.

Enhancing Voice-Over-LTE Calls Using IMS Proxy Operation

In some embodiments, VoLTE enhancement system 20 reduces the above-described round-trip reaction time by acting as a proxy to IMS 48. Consider an example scenario in which UE 28 encounters a reception problem during a VoLTE call, and therefore sends to IMS 48 an RTCP notification that reports the problem. Typically, IMS 48 would react to the notification by modifying some characteristic of subsequent VoLTE call traffic to this UE, such as switching to a more robust speech coding scheme (codec) or Error Correction Coding (ECC) scheme.

In order to shorten the reaction time in such scenarios, processor 52 of system 20 detects the RTCP notification sent by UE 28, and predicts the modification that the IMS is likely to perform to the characteristics of subsequent VoLTE call traffic. Processor 52 then intercepts in-flight VoLTE call traffic destined to the UE, and modifies the traffic accordingly.

Assume, for example, that processor 52 predicts that the IMS is likely to switch from a first speech coding scheme to a second speech coding scheme in response to the RTCP notification. In such a scenario, processor 52 may intercept VoLTE call traffic that is in-flight, i.e., that was transmitted en-route to the UE before the modification took effect and is still coded with the first speech coding scheme.

Upon intercepting such traffic, processor 52 changes the speech coding in the traffic from the first scheme to the second scheme, and forwards the modified traffic toward the UE. As a result, the reaction time to the RTCP request, as seen by the UE, is considerably shorter than the full round-trip delay.

The example above refers to modification of speech coding scheme, but the disclosed technique can be applied in a similar manner to other characteristics, such as ECC. Typically, the modification applied by processor 52 is performed independently of the actions of IMS 48, without coordination with the IMS and transparently to the IMS. In some embodiments, processor 52 continues to monitor the RTCP traffic, for example in order to verify whether its prediction was correct and to make additional changes if needed.

Figure 4:
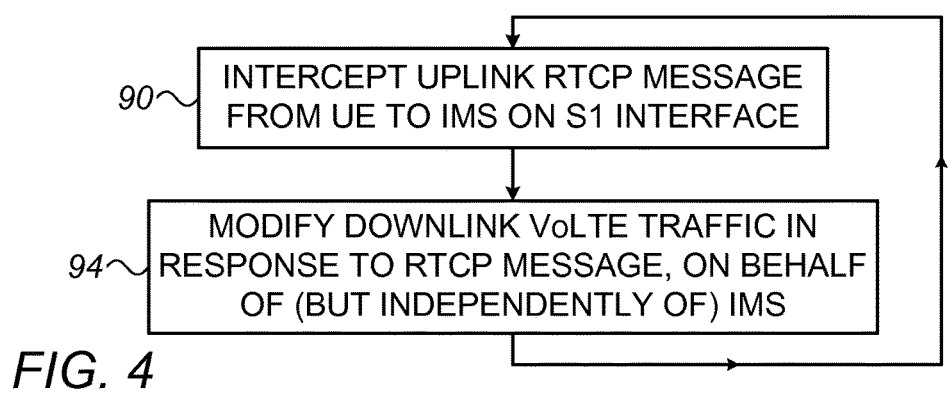
FIG. 4 is a flow chart that schematically illustrates a method for enhancing VoLTE calls using IMS proxy operations, in accordance with an embodiment of the present invention.

FIG. 4 is a flow chart that schematically illustrates a method for enhancing VoLTE calls using IMS proxy operations, in accordance with an embodiment of the present invention. The method begins with processor 52 of system 20 intercepting an RTCP notification sent from UE 28 to IMS 48 on the S1 interface, at a notification detection step 90. At a modification step 94, processor modifies one or more characteristics of in-flight VoLTE call traffic destined to the UE, using the modification that the IMS is predicted to perform.

Although the embodiments described herein mainly address Voice over LTE, the methods and systems described herein can also be used in other applications, such as in various Voice over IP (VoIP) and media streaming applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
   in a wireless data network, monitoring communication conditions at an intermediate location between a wireless communication terminal and a network element that provides voice-call services over the wireless data network to the wireless communication terminal;
   upon detecting, at the intermediate location, that the communication conditions are expected to cause the wireless communication terminal to send a notification on degrading reception quality of a voice call to the network element, sending, from the intermediate location, an early notification on degrading reception quality of a voice call, in a format as if the notification originated from the wireless communication terminal, to the network element on behalf of the wireless communication terminal; and
   detecting, at the intermediate location, a notification transmitted from the wireless terminal to the network element, similar to the early notification, and discarding the detected notification.

2. The method according to claim 1, wherein detecting the communication conditions and sending the early notification are performed during a voice call conducted by the wireless communication terminal.

3. The method according to claim 1, wherein sending the early notification is performed independently of and transparently to the wireless communication terminal.

4. The method according to claim 1, wherein detecting the communication conditions is performed at a point in time at which the wireless communication terminal is unaware that the communication conditions warrant sending the notification.

5. The method according to claim 1, wherein the wireless data network comprises a Long-Term Evolution (LTE) or LTE-Advanced (LTE-A) network, and wherein the voice-call services comprise Voice-over-LTE (VoLTE) services.

6. The method according to claim 1, wherein the intermediate location comprises a backhaul interface of the wireless data network.

7. The method according to claim 1, wherein the early notification on degrading reception quality of a voice call comprises a notification configured to cause the network element to change a speech coding scheme of the voice call.

8. The method according to claim 1, wherein the early notification on degrading reception quality of a voice call comprises a notification configured to cause the network element to change an error correction coding scheme of the voice call.

9. The method according to claim 1, wherein detecting that the communication conditions are expected to cause the wireless communication terminal to send a notification on degrading reception quality comprises detecting that a network node is heavily loaded or overloaded.

10. A communication apparatus, comprising:
an interface for connecting to a wireless data network that serves wireless communication terminals; and
processing circuitry, which is configured to monitor communication conditions at an intermediate location between a wireless communication terminal and a network element that provides voice-call services over the wireless data network to the wireless communication terminal, and, upon detecting that the communication conditions are expected to cause the wireless communication terminal to send a notification on degrading reception quality of a voice call to the network element, to send an early notification on degrading reception quality of a voice call, in a format as if the notification originated from the wireless communication terminal, to the network element on behalf of the wireless communication terminal, and upon detecting, at the intermediate location, a notification transmitted from the wireless terminal to the network element, similar to the early notification, to discard the detected notification.

11. The apparatus according to claim 10, wherein the processing circuitry is configured to detect the communication conditions and send the early notification during a voice call conducted by the wireless communication terminal.

12. The apparatus according to claim 10, wherein the processing circuitry is configured to send the early notification independently of and transparently to the wireless communication terminal.

13. The apparatus according to claim 10, wherein the wireless data network comprises a Long-Term Evolution (LTE) or LTE-Advanced (LTE-A) network, and wherein the voice-call services comprise Voice-over-LTE (VoLTE) services.

14. The apparatus according to claim 10, wherein the intermediate location comprises a backhaul interface of the wireless data network.

15. A method for communication, comprising:
in a wireless data network in which a network element provides voice-call services to wireless communication terminals, detecting, by an enhancement system at an intermediate location between the wireless communication terminals and the network element, a notification in which a wireless communication terminal notifies the network element of degraded reception performance;
predicting, by the enhancement system, a modification that the network element is expected to perform in a transmission characteristic to the wireless communication terminal in response to the notification; and
intercepting, by the enhancement system, in-flight communication traffic that is en-route to the wireless communication terminal and whose transmission characteristic is not yet modified in response to the notification, and applying the predicted modification to the in-flight communication traffic.

16. The method according to claim 15, wherein predicting and applying the modification are performed during a voice call conducted by the wireless communication terminal.

17. The method according to claim 15, wherein predicting and applying the modification are performed independently of and transparently to the network element.

18. The method according to claim 15, wherein applying the modification comprises modifying a speech coding scheme used in a voice call conducted by the wireless communication terminal.

19. The method according to claim 15, wherein applying the modification comprises modifying an error correction coding scheme used in a voice call conducted by the wireless communication terminal.

20. The method according to claim 15, wherein the wireless data network comprises a Long-Term Evolution (LTE) or LTE-Advanced (LTE-A) network, and wherein the voice-call services comprise Voice-over-LTE (VoLTE) services.

21. The method according to claim 15, wherein detecting the notification and applying the modification are performed on a backhaul interface of the wireless data network.

22. A communication apparatus, comprising:
an interface for connecting to a wireless data network in which a network element provides voice-call services to wireless communication terminals, at an intermediate location between the wireless communication terminals and the network element; and
processing circuitry, which is configured to detect in signals collected through the interface at the intermediate location, a notification in which a wireless communication terminal notifies the network element of degraded reception performance, to predict a modification that the network element is expected to perform in a transmission characteristic to the wireless communication terminal in response to the notification, to intercept in-flight communication traffic that is en-route to the wireless communication terminal and whose transmission characteristic is not yet modified in response to the notification, and to apply the predicted modification to the in-flight communication traffic.

23. The apparatus according to claim 22, wherein the processing circuitry is configured to predict and apply the modification during a voice call conducted by the wireless communication terminal.

24. The apparatus according to claim 22, wherein the processing circuitry is configured to predict and apply the modification independently of and transparently to the network element.

25. The apparatus according to claim 22, wherein the processing circuitry is configured to apply the modification by modifying a speech coding scheme used in a voice call conducted by the wireless communication terminal.

26. The apparatus according to claim 22, wherein the processing circuitry is configured to apply the modification by modifying an error correction coding scheme used in a voice call conducted by the wireless communication terminal.

27. The apparatus according to claim 22, wherein the wireless data network comprises a Long-Term Evolution (LTE) or LTE-Advanced (LTE-A) network, and wherein the voice-call services comprise Voice-over-LTE (VoLTE) services.

28. The apparatus according to claim 22, wherein the processing circuitry is configured to detect the notification and apply the modification on a backhaul interface of the wireless data network.

\* \* \* \* \*